Sept. 10, 1940.   J. G. LENTA   2,214,639
REAR-VISION MIRROR
Filed May 24, 1939

INVENTOR.
Joseph G. Lenta.
BY   Geo. Stevens.
ATTORNEY.

Patented Sept. 10, 1940

2,214,639

UNITED STATES PATENT OFFICE 2,214,639

REAR-VISION MIRROR

Joseph G. Lenta, Duluth, Minn.

Application May 24, 1939, Serial No. 275,503

1 Claim. (Cl. 88—87)

This invention relates to rear vision mirrors for automobiles, the principal object being to provide an improved form of mirror whereby to insure added safety in driving an automobile.

Another object is to provide such a mirror in which portions thereof are individually adjustable for convenience in adapting same to the best advantage for different sized and shaped automobiles.

Other objects and advantages of the invention will appear in the following description thereof.

Referring now to the accompanying drawing, forming part of this application, and wherein like reference characters indicate like parts:

Figure 1:
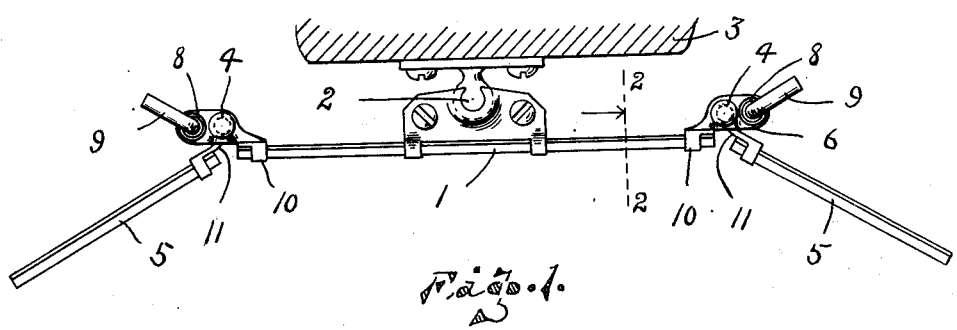
Figure 1 is a top plan view of a mirror involving one embodiment of the invention and as attached to the moulding of the interior of an automobile.
Figure 2:
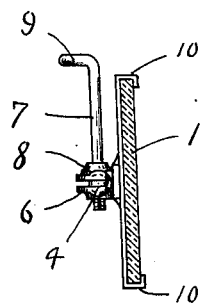
Figure 2 is a section on the line 2—2, Figure 1.

In the drawing, the numeral 1 represents an ordinary flat vertically disposed mirror, such as is commonly used in a passenger vehicle, and supported in the usual substantially universally movable manner by the ball and socket joint, as indicated at 2. 3 represents the moulding over the windshield of an ordinary car to which the ball portion of the joint assembly is suitably fixed in any desired manner.

At either end of the central mirror 1 is pivotally attached as by a suitable ball and socket union indicated at 4 a wing like section of mirror indicated at 5. The universal joint 4 for connecting either end of the mirror to its respective wing section is shown as constructed of a bifurcated socket member 6 protruding laterally sufficiently for the reception of the locking pintle 7 which is screw threadedly mounted within the lower half of the bifurcated portion 6 and carries a collar 8 for impingement against the upper member of the bifurcated portion 6 so that when the pintle is screwed down tightly the ball and socket joint will be firmly held in any desired predetermined position. For convenience in adjustment of the pintle I have shown the simplest construction possible in that the upper end is bent at right angles as at 9 and extends slightly above the wing member for convenience of access, it being evident that the socket portion of the joint is fixed as by the overlapping clip portion 10 to the end of the central mirror 1. The wing member 5 carries in a similar manner the ball portion of the joint, the shank of which is illustrated at 11 to form a substantial and readily adjustable union of the wing portions of the mirror.

After installation within an automobile or other vehicle it is contemplated that in service the wing members will reflect the objects viewed through diagonally opposite corners of the interior of the car and that the driver thus may be constantly cognizant of what is taking place not only in the rear of the car but at either side of the rear thereof. Or, when the wings are adjusted to the same plane as that of the central portion, the entire mirror may be made to function normally, but covering a greater area of the conditions in the rear, or the wing members may be adjusted to the opposite angular position to that shown in the drawing, if preferred.

Having thus described my invention, what I claim and desire to secure by Letters Patent, is:

A rear vision mirror for automobiles comprising a central universally adjustable section of mirror mountable upon the inside body of an automobile, and a wing section of mirror universally attached to either end of said central section, said attachments each comprising a two-part bracket, one part being attached to the end of one member and having a ball thereon, and another part being attached to another member and having a bifurcated socket therein adapted to surround the ball, a pintle screw threaded within one of the bifurcated portions of the socket, extending through and bearing against the other portion of the socket for regulating the tension of the socket about the ball, said pintle extending above the upper edge of the mirror wings for convenience in operation.

JOSEPH G. LENTA.